T. J. LEE.
CULTIVATOR.

No. 170,632.  Patented Nov. 30, 1875.

WITNESSES  INVENTOR

UNITED STATES PATENT OFFICE.

THOMAS J. LEE, OF PENDER COUNTY, NORTH CAROLINA.

IMPROVEMENT IN CULTIVATORS.

Specification forming part of Letters Patent No. 170,632, dated November 30, 1875; application filed October 8, 1875.

*To all whom it may concern:*

Be it known that I, THOMAS J. LEE, of the county of Pender, in the State of North Carolina, have invented a new and useful Improvement in Cultivators, which improvement is fully set forth in the following specification, reference being had to the accompanying drawings.

The nature of my invention consists in attaching to an ordinary plow, C, by the bent braces $e\ f\ g$, the front and rear blades or sweeps A and B, set at such angle with line of plow as to sweep to such width as may be desired, the lower edges of blades A and B to be set, ordinarily, about one and one-half inch above the level of point of plow C.

This implement being run along the left side of a row, the front blade A cuts away and removes all grass and weeds before it; the plowshare C, following, covers up such grass, weeds, &c.; and the rear blade B, following, scrapes up clean earth toward and to the row, leaving the surface of ground at about the same level as before.

Figure 1:
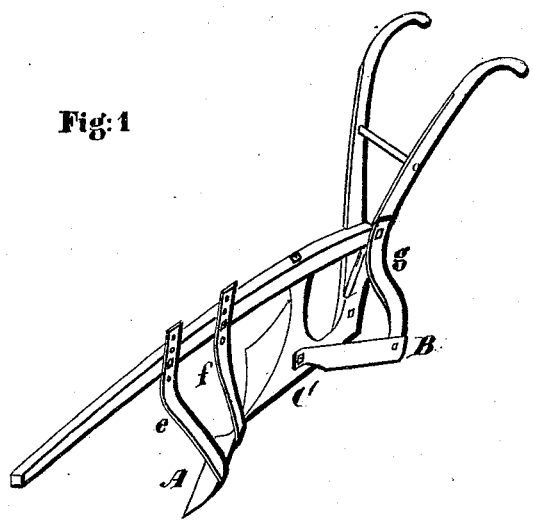
Figure 2:
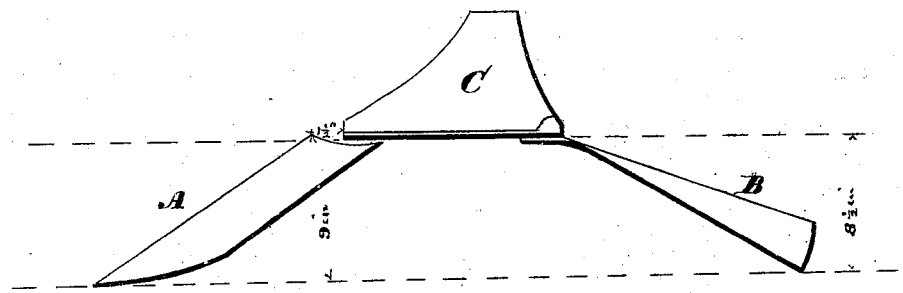

In the drawing, Figure 1 shows a perspective view of the improved cultivator. Fig. 2 shows, in plan, the relative positions of plowshare C, and front and rear blades A and B.

The blade A is shown in Fig. 2 fifteen and one-half inches long, (the front end pointed,) six inches wide, and one-eighth inch thick, and should be of steel. The rear blade B, (also of steel,) is shown eighteen inches long, six inches wide, and one-eighth inch thick, both blades being curved, as shown in drawings. The blade B is secured at inner end to standard-bolt of plow C. The stays $e\ f\ g$ have a number of slots at upper end, to facilitate the settting of blades A and B, to suit the heights of different plows.

The whole forms an improved cultivator, the use of which almost entirely dispenses with that of the hoe, and thus very much reduces the cost of cultivating cotton, corn, potatoes, and other drill crops.

I claim as my invention—

In combination with an ordinary plow, C, the front and rear blades A and B, substantially as and for the purposes set forth.

THOS. J. LEE.

Witnesses:
WM. H. JAMES,
WM. E. FREEMAN.